(12) United States Patent
Zhang

(10) Patent No.: US 9,692,986 B2
(45) Date of Patent: Jun. 27, 2017

(54) DISPLAY DEVICE AND METHOD FOR SHOOTING AND DISPLAYING IMAGES

(71) Applicant: GUANGDONG OPPO MOBILE TELECOMMUNICATIONS CORP., LTD, Dongguan (CN)

(72) Inventor: Weizheng Zhang, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/039,330

(22) PCT Filed: Oct. 9, 2014

(86) PCT No.: PCT/CN2014/088203
§ 371 (c)(1),
(2) Date: May 25, 2016

(87) PCT Pub. No.: WO2015/078236
PCT Pub. Date: Jun. 4, 2015

(65) Prior Publication Data
US 2017/0142342 A1    May 18, 2017

(30) Foreign Application Priority Data
Nov. 26, 2013    (CN) .......................... 2013 1 0608258

(51) Int. Cl.
*H04N 5/265*    (2006.01)
*H04N 5/225*    (2006.01)
(Continued)

(52) U.S. Cl.
CPC ........... *H04N 5/265* (2013.01); *G02F 1/1341* (2013.01); *G02F 1/1368* (2013.01);
(Continued)

(58) Field of Classification Search
CPC .. H04N 5/265; H04N 5/2254; H04N 5/23293; H04N 5/2628; H04N 9/09;
(Continued)

(56) References Cited

U.S. PATENT DOCUMENTS

2009/0180071 A1    7/2009    Fateh
2010/0207911 A1*   8/2010    Newton .............. G06F 3/0428
                                                                345/175

(Continued)

FOREIGN PATENT DOCUMENTS

CN    101119435 A    2/2008
CN    102348091 A    2/2012
(Continued)

OTHER PUBLICATIONS

Translation of the International Search Report and Written Opinion corresponding to International Patent Application No. PCT/CN2014/088203, mailed Dec. 31, 2014, 11 pages.

*Primary Examiner* — Tuan Ho
(74) *Attorney, Agent, or Firm* — Lathrop & Gage LLP

(57) ABSTRACT

The present disclosure relates to a display device and a method for shooting and displaying an image. The display device includes a displayer and a camera installed in the displayer and configured to shoot images of an external object directly facing the displayer. The camera includes a plurality of lens components installed at intervals on a surface of the displayer, a plurality of photosensitive components matched with the plurality of lens components respectively, and a set of image processing chips configured to process the images generated by the camera.

20 Claims, 3 Drawing Sheets

(51) Int. Cl.
| | |
|---|---|
| *G02F 1/1335* | (2006.01) |
| *G02F 1/1368* | (2006.01) |
| *G02F 1/1341* | (2006.01) |
| *H04N 5/232* | (2006.01) |
| *H04N 9/09* | (2006.01) |
| *H04N 5/262* | (2006.01) |
| *G02F 1/1333* | (2006.01) |

(52) U.S. Cl.
CPC ..... *G02F 1/133528* (2013.01); *H04N 5/2254* (2013.01); *H04N 5/2258* (2013.01); *H04N 5/23293* (2013.01); *H04N 5/2628* (2013.01); *H04N 9/09* (2013.01); *G02F 2001/133302* (2013.01)

(58) Field of Classification Search
CPC ............. G02F 1/133528; G02F 1/1314; G02F 1/1368; G02F 2001/133302
See application file for complete search history.

(56) References Cited

U.S. PATENT DOCUMENTS

2011/0134036 A1* 6/2011 Suggs ................... G06F 3/0421
  345/158
2016/0366340 A1* 12/2016 Okamoto ........... H04N 5/23293

FOREIGN PATENT DOCUMENTS

| CN | 202696751 U | 1/2013 |
|----|-------------|--------|
| CN | 103780812 A | 5/2014 |

* cited by examiner

```
RGBRGB          RGB □ RGB
BRGBRG          BRG □ BRG
RGBRGB          RGB □ RGB
BRGBRG          BRG □ BRG
```

Fig. 4                Fig. 5

DISPLAY DEVICE AND METHOD FOR SHOOTING AND DISPLAYING IMAGES

This application is based on and claims priority to Chinese Patent Application No. 201310608258.5, titled "display device and shooting display method thereof", filed on Nov, 26, 2013, the entire contents of which are incorporated herein by reference.

TECHNICAL FIELD

The present disclosure relates to the electronic device field, and more particularly, to a display device and a method for shooting and shooting and displaying an image.

BACKGROUND

In the related art, a display with a camera function is typically provided with a front camera which is generally disposed at an upper part of the display. When a user takes a selfie using such a display with the front camera, he needs to look steadily at the front camera so as to acquire a photo with high quality. In this case, the user cannot gaze at the screen to observe effect of the selfie at the same time. However, if the user moves eyes from the front camera and looks steadily at the screen, a selfie with high quality cannot be acquired.

SUMMARY

An objective of the present disclosure is to solve the above problems of the existing display screen, and to provide a display device with a camera function, in which a plurality of micro photosensitive imaging components are discretely disposed on a surface of a display screen, such that an object directly facing the display screen may be photographed from several angels and then a composite image with high quality may be acquired by a further subsequent processing.

The technical solution adopted by the present disclosure for solving the technical problems may be described as follows.

A display device is provided to include a displayer and a camera installed in the displayer and configured to shoot images of an external object facing the displayer, the camera includes a plurality of lens components installed at intervals on a surface of the displayer, a plurality of photosensitive components matched with the plurality of lens components respectively, and a set of image processing chips configured to process the images generated by the camera.

In at least one embodiment, the displayer includes an upper substrate assembly, a liquid crystal layer, a lower substrate assembly and a backlight assembly arranged in sequence, wherein, the upper substrate assembly includes an upper polarizer, an upper glass substrate and a filter arranged in sequence; the lower substrate assembly includes a lower glass substrate, a TFT (thin film transistor) array and a lower polarizer arranged in sequence; and the liquid crystal layer is filled between the upper substrate assembly and the lower substrate assembly.

In at least one embodiment, the display device further includes: a driving circuit, configured to supply power to drive respective parts in the display device.

In at least one embodiment, the set of image processing chips is integrated in the driving circuit.

In at least one embodiment, the set of image processing chips includes: an image recognizing chip configured for image recognition; and an image overlaying and processing chip configured for image overlaying and post-processing.

In at least one embodiment, the plurality of photosensitive components are connected to the image recognizing chip, and the image recognizing chip is connected to the image overlaying and processing chip.

In at least one embodiment, the filter includes a pixel area configured to form pixels, the plurality of photosensitive components are fixed on the filter and disposed at intervals in the pixel area.

In at least one embodiment, the plurality of lens components are disposed on the upper glass substrate and correspond to the plurality of photosensitive components on the filter respectively.

There is also provided a method for shooting and displaying an image, including the followings:
  providing the display device described above, and starting function of shoot;
  generating images by the plurality of photosensitive components, by making light emitted from an object facing the display device pass through the polarizer, enter the plurality of lens components and enter the plurality of photosensitive components, and inputting the images into the set of image processing chips;
  performing an overlaying process on the images by the set of image processing chips to acquire a composite image;
  performing a smooth transition process on the composite image by the set of image processing chips to acquire a processed composite image; and
  outputting and displaying the processed composite image by the displayer.

In at least one embodiment, the method may further include: determining whether the display device is displaying another device before outputting and displaying the processed composite image by the displayer; if the display device is not displaying another image when shooting, outputting by the displayer module the processed composite image to a center of a screen of the display device for displaying; if the display device is displaying another image when shooting, zooming in a display window of the image displayed and arranging the display window at a corner of the screen of the display device, and outputting by the displayer module the processed composite image to a center of a screen of the display device for displaying.

In the display device with a camera function according to embodiments of the present disclosure, a plurality of micro photosensitive imaging components are discretely disposed on a surface of a display screen, such that an object directly facing the display screen may be photographed from several angles, and then a composite image with high quality may be acquired after post-processing. When a user uses the display device according to the present disclosure to conduct a video chat, a video image as if the pupils of the user direct to the camera may be obtained if the user looks at the center of display screen, such that problems existing in the related art may be solved.

BRIEF DESCRIPTION OF THE DRAWINGS

In order to make the technical solutions of embodiments of the present invention more clearly, the accompanying drawings used in the description of embodiments of the present invention are briefly described hereunder. Obviously, the described drawings are merely some embodiments of present invention. For persons skilled in the art, other drawings may be obtained based on these drawings without any creative work.

FIG. 4 is a schematic diagram of a pixel area of the filter shown in FIG. 2.

FIG. 5 is a schematic diagram of a plurality of photosensitive components of the filter shown in FIG. 2.

DETAILED DESCRIPTION

To make the objectives, the technical solutions, and the advantages of embodiments of the present invention clearer, the technical solutions in embodiments of the present invention are hereinafter described clearly and completely with reference to the accompanying drawings in embodiments of the present invention. Apparently, the described embodiments are merely a part of embodiments of the present invention, rather than all embodiments of the present invention. All other embodiments obtained by persons of ordinary skill in the art based on embodiments of the present invention without creative efforts shall fall within the protection scope of the present invention.

Figure 1:
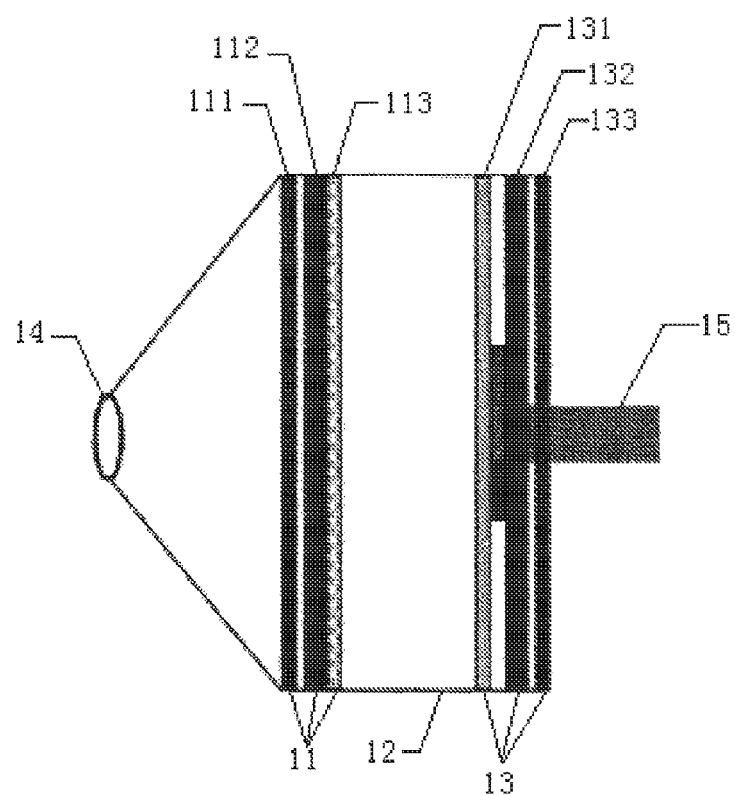
FIG. 1 is a section view of a display device according to an embodiment of the present disclosure.

FIG. 1 illustrates a displayer 1 of a display device with a camera function provided in an embodiment of the present disclosure. As shown in FIG. 1, the displayer 1 includes an upper substrate assembly 11, a liquid crystal layer 12, a lower substrate assembly 13, a backlight assembly 14 and a driving circuit 15 arranged in sequence. Wherein, the upper substrate assembly 11 includes an upper polarizer 111, an upper glass substrate 112 and a filter 113 arranged in sequence. The lower substrate assembly 13 includes a lower glass substrate 131, a TFT array 132 and a lower polarizer 133 arranged in sequence. The liquid crystal layer 12 is filled between the upper substrate assembly 11 and the lower substrate assembly 13.

In at least one embodiment, the working principle of the displayer 1 is similar to that of a liquid crystal display in the related art. A TFT switch is controlled via a voltage at each pixel located at each row and column, such that a rotate degree of liquid crystal molecule may be controlled so as to control a display degree of each RGB sub pixel, thereby generating an image.

A camera 2 is integrated in the displayer 1. In at least one embodiment, the camera 2 may include a plurality of camera sub-modules installed at intervals on a surface of the displayer 1. Each camera sub-module of the camera 2 is configured to shoot an image of a region above the display screen and directly facing the camera sub-module. The camera 2 includes a plurality of lens components 21, a plurality of photosensitive components 22 matched with the plurality of lens components 21 respectively, and a set of image processing chips 23. The set of image processing chips 23 is configured to process images generated by the camera 2 and to output a processed image.

In at least one embodiment, the set of image processing chips 23 is integrated in the driving circuit 15. The set of image processing chips 23 may include a driving chip configured for image recognition, more specifically and optionally, a CMOS-LCD driving chip.

The set of image processing chips 23 further includes an image overlaying and processing chip configured for image overlaying and post-processing, more specifically and optionally, a VGA control chip. After a processing of such a chip, an overlay process is performed on images shot by all the photosensitive components 22 and a complete image may be typically acquired. An equivalent shooting angle of this complete image may be directly facing the display screen. Thus, this image is equivalent to an image photographed by a camera at the center of display screen from an angle perpendicular to the display screen. Since a photosensitive component 22 for imaging includes a plurality of photosensitive pixels, the image generated after the processing has a more clear and comprehensive display effect than an image photographed by a conventional single camera.

In at least one alternative embodiment, images photographed by some photosensitive components 22 at some certain positions may be selected to be overlaid so as to generate a complete image. By selecting photosensitive components 22 at different positions, images photographed by photosensitive pixels at different positions may be acquired and overlaid so as to generate images at different shooting positions and angles.

Figures 2, 3:
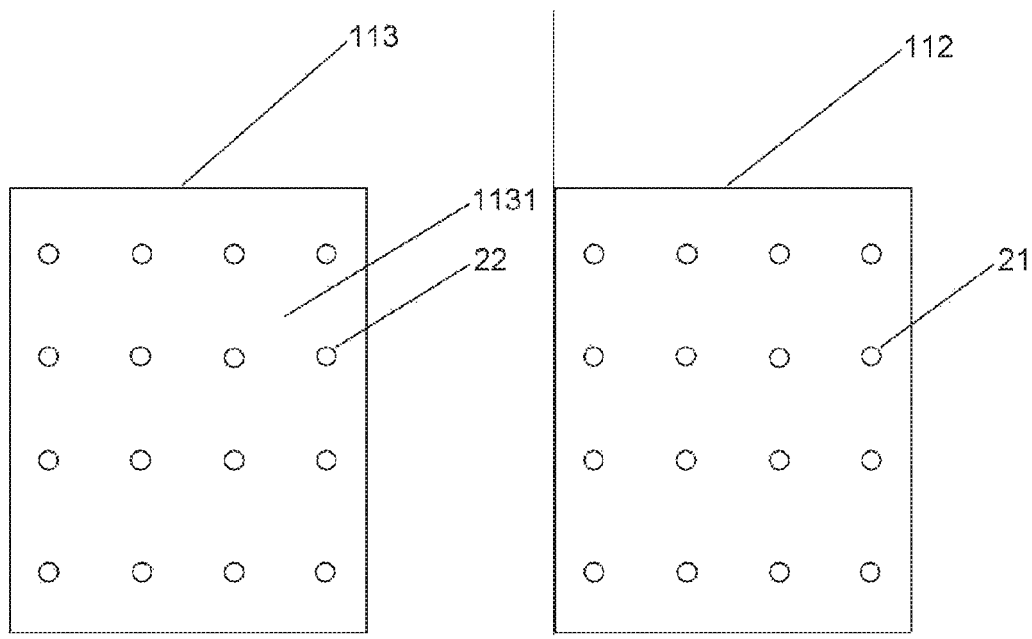
FIG. 2 is a schematic diagram of a surface structure of a filter in the display device shown in FIG. 1.
FIG. 3 is a schematic diagram of a structure of an upper glass substrate and a plurality of lens components in the display device shown in FIG. 1.

FIG. 2 is a schematic diagram of a structure of a filter 113 shown in FIG. 1, and FIG. 3 is a schematic diagram of a structure of an upper glass substrate 112 and a plurality of lens components 21 corresponding to the filter 113. Referring to FIGS. 2 and 3, the position of the filter 113 is matched with the position of the upper glass substrate 112, and the plurality of lens components 21 on the upper glass substrate 112 correspond to the plurality of photosensitive components 22 on the filter 113 respectively.

In FIG. 2, the filter 113 includes a pixel area 1131 and a plurality of photosensitive components 22.

In at least one embodiment, the filter 113 includes a pixel area 1131 and a plurality of photosensitive components 22. The plurality of photosensitive components 22 are fixed on the filter 113 and disposed at intervals in the pixel area 1131. The pixel area 1131 is configured to form pixels, which consists of RGB arrays. In at least one embodiment, the plurality of photosensitive components 22 are discretely distributed in the pixel area 1131. The arrangement of the plurality of photosensitive components 22 may be designed as needed. Considering the imaging requirement, the plurality of photosensitive components 22 may be designed in a way that they are uniformly disposed on a whole surface of the filter 113, such that a better imaging effect may be obtained.

In FIG. 3, the plurality of lens components 21 are disposed on the upper glass substrate 112 and correspond to the plurality of photosensitive components 22 respectively. When the plurality of photosensitive components 22 are uniformly disposed on the whole surface of the filter 113, the plurality of lens components 21 are also uniformly disposed on the whole surface of the glass substrate 112. Such design is equivalent to that a plurality of micro cameras are discretely disposed on the surface of display screen, such that the images of the region directly facing the display screen may be photographed from several angles and then may be subsequently processed by the set of image processing chips 23, so as to acquire a composite image with a high quality. When a user uses this display screen to conduct a video chat, a video image as if the pupils of the user direct to the camera may be obtained if the user looks at the center of display screen.

FIG. 4 is a schematic diagram of the pixel area 1131 shown in FIG. 2, and FIG. 5 is a schematic diagram of the plurality of photosensitive components 22 shown in FIG. 2. The pixel area 1131 only includes RGB arrays. The plurality of photosensitive components 22 include RGB arrays and photosensitive points 221. The photosensitive points and the RGB arrays are disposed alternatively. In at least one embodiment, the RGB array is similar to that in an existing liquid crystal display and the photosensitive point may consist of a thin layer of photosensitive material. In at least one embodiment, silver salt photosensitive material such as silver halide grain may be chosen and used.

Figure 6:
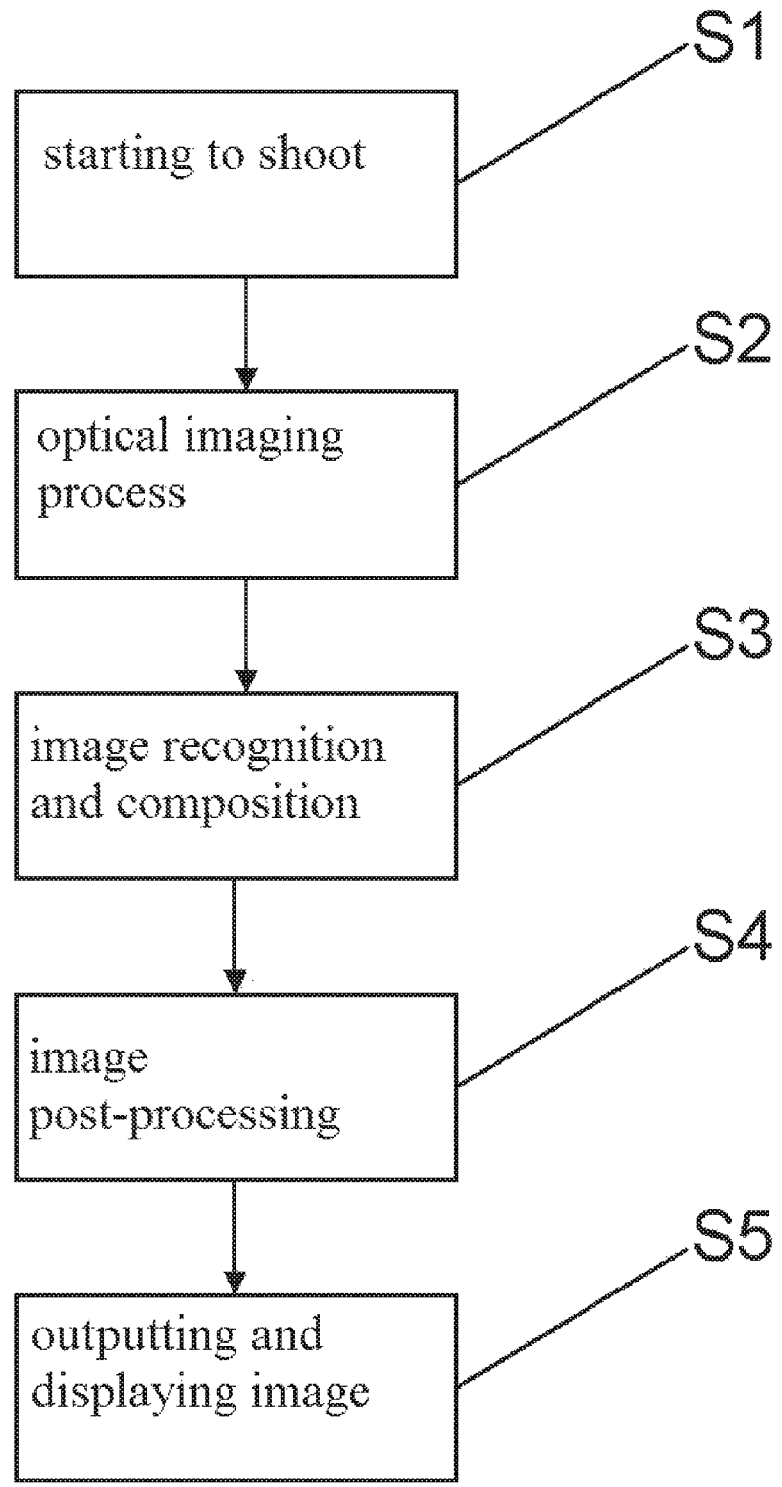
FIG. 6 is a flow chart of a method for shooting and displaying an image in the display device shown in FIG. 1.

FIG. 6 is a flow chart showing a method for shooting and displaying an image in the display screen shown in FIG. 1.

In step S1, the display device shown in FIG. 1 is provided and function of shoot is started.

In step S2, the light from an object facing a display screen of the display device passes through the upper polarizer 111, enters the plurality of lens components 21, and then enters the plurality of photosensitive components 22 after being focused by the plurality of lens components 21, such that images may be generated and inputted into the set of image processing chips 23.

In step S3, an image recognition and overlaying process is performed on the images by the set of image processing chips 23, so as to acquire a composite image.

In step S4, a smooth transition process is performed on the composite image by the set of image processing chips 23 so as to acquire a processed composite image.

In step S5, the processed composite image is outputted and displayed using the displayer 1 of the display device shown in FIG. 1, such that a video image of the region directly facing the display screen may be obtained in the display screen. In at least one embodiment, before outputting and displaying the image, it is determined whether the display device is displaying another image. If the display device is not displaying another image when shooting, the displayer outputs the processed composite image to the center of screen of the display device for displaying.

If the display device is displaying another image when shooting, the display window of the displayed image is zoomed out and arranged at a corner of screen of the display device. Then, the displayer outputs the processed composite image to the center of screen of the display device for displaying.

In the related art, a display with a camera function is typically provided with a front camera which is generally disposed at an upper of the display. When a user takes a selfie using such a display with a front camera, he needs to look steadily at the front camera so as to acquire a selfie with high quality. In this case, the user cannot gaze at the screen to observe effect of the selfie at the same time. However, if the user moves eyes from the front camera and looks steadily at the screen, a photo with high quality cannot be acquired.

In the display device with a camera function according to embodiments of the present disclosure, a plurality of micro photosensitive imaging components are discretely disposed on a surface of a display screen, such that an object directly facing the display screen may be photographed from several angles, and then a composite image with high quality may be acquired after post-processing. When a user uses the display device according to the present disclosure to conduct a video chat, a video image as if the pupils of the user direct to the camera may be obtained if the user looks at the center of display screen, such that problems existing in the related art may be solved.

Since the foregoing description as directed only to a preferred embodiment of the invention, various changes and modifications apparent to those skilled in the art, can be made to these features and embodiments without departing from the spirit and scope of the present disclosure. Moreover, under the guidance of the present disclosure, various modifications may be made to these features and embodiments to adapt to specific situations and materials, without departing from the spirit and scope of the present disclosure. Thus, the present disclosure is not limited to the specific embodiments described herein. All embodiments falling within the scope of claims of the present disclosure shall fall within the protection scope of the present disclosure.

What is claimed is:

1. A display device, comprising:
   a displayer; and
   a camera, installed in the displayer and configured to shoot images of an external object facing the displayer, wherein the camera comprises:
   a plurality of lens components, installed at intervals on a surface of the displayer;
   a plurality of photosensitive components, matched with the plurality of lens components respectively; and
   a set of image processing chips, configured to process the images generated by the camera.

2. The display device according to claim 1, wherein the displayer comprises an upper substrate assembly, a liquid crystal layer, a lower substrate assembly and a backlight assembly arranged in sequence;
   the upper substrate assembly comprises an upper polarizer, an upper glass substrate and a filter arranged in sequence;
   the lower substrate assembly comprises a lower glass substrate, a TFT array and a lower polarizer arranged in sequence;
   the liquid crystal layer is filled between the upper substrate assembly and the lower substrate assembly.

3. The display device according to claim 2, further comprising:
   a driving circuit, configured to supply power to drive the display device.

4. The display device according to claim 3, wherein the set of image processing chips is integrated in the driving circuit.

5. The display device according to claim 4, wherein the set of image processing chips comprises:
   an image recognizing chip, configured for image recognition; and
   an image overlaying and processing chip, configured for image overlaying and post-processing.

6. The display device according to claim 5, wherein the plurality of photosensitive components are connected to the image recognizing chip, and the image recognizing chip is connected to the image overlaying and processing chip.

7. The display device according to claim 2, wherein the filter comprises a pixel area configured to form pixels, and the plurality of photosensitive components are fixed on the filter and disposed at intervals in the pixel area.

8. The display device according to claim 2, wherein the plurality of lens components are disposed on the upper glass substrate and correspond to the plurality of photosensitive componentsunits on the filter respectively.

9. A method for shooting and displaying an image, comprising:
   starting function of shoot of a display device, wherein the display device comprises a displayer and a camera installed in the displayer, the camera comprises a plurality of lens components installed at intervals on a surface of the displayer, a plurality of photosensitive components matched with the plurality of lens components respectively and a set of image processing chips connected with the plurality of photosensitive components;

generating images by the plurality of photosensitive components, and inputting the images into the set of image processing chips;

performing an overlaying process on the images by the set of image processing chips to acquire a composite image;

performing a post-process on the composite image by the set of image processing chips to acquire a processed composite image; and outputting and displaying the processed composite image by the displayer.

10. The method according to claim 9, further comprising:

determining whether the display device is displaying another image before outputting and displaying the processed composite image;

if the display device is not displaying another image, outputting by the displayer the processed composite image to a center of a screen of the display device for displaying;

if the display device is displaying another image, zooming out a display window of the image displayed and arranging the display window at a corner of the screen of the display device, and outputting by the displayer the processed composite image to a center of a screen of the display device for displaying.

11. The display device according to claim 7, wherein the plurality of photosensitive components are uniformly disposed in the pixel area.

12. The display device according to claim 11, wherein the plurality of lens components are uniformly disposed on the upper glass substrate.

13. The display device according to claim 5, wherein the image overlapping and processing chip is further configured to select one or more of the images generated by the camera and to perform the image overlaying on the one or more of the images selected.

14. The display device according to claim 5, wherein the image overlapping and processing chip is further configured to perform an overlaying process on the images generated by the camera to acquire a complete image, and to perform a smooth transition process on the complete image to acquire an output image.

15. The display device according to claim 1, wherein the photosensitive component comprises a RGB array and a plurality of photosensitive points arranged alternatively.

16. The display device according to claim 15, wherein the photosensitive point is made of a thin layer of silver halide grain.

17. The method according to claim 9, further comprising:

selecting some of the images generated by the plurality of photosensitive components; and performing the overlaying process on the images selected.

18. The method according to claim 9, wherein the post-process comprises a smooth transition process.

19. A display device, comprising:

a displayer, comprising an upper substrate assembly, a liquid crystal layer, a lower substrate assembly and a backlight assembly arranged in sequence; and a camera, installed in the displayer and configured to shoot images of an external object facing the displayer, wherein the camera comprises:

a plurality of lens components, installed at intervals on a surface of the displayer;

a plurality of photosensitive components, matched with the plurality of lens components respectively; and a set of image processing chips, configured to process the images generated by the camera.

20. The display device according to claim 19, wherein:

the upper substrate assembly comprises an upper polarizer, an upper glass substrate and a filter arranged in sequence;

the lower substrate assembly comprises a lower glass substrate, a TFT array and a lower polarizer arranged in sequence; and the liquid crystal layer is filled between the upper substrate assembly and the lower substrate assembly.

* * * * *